Nov. 10, 1925.
S. D. POLSEN
1,560,605
BUTTON FEEDING MECHANISM
Filed March 12, 1924      2 Sheets-Sheet 1
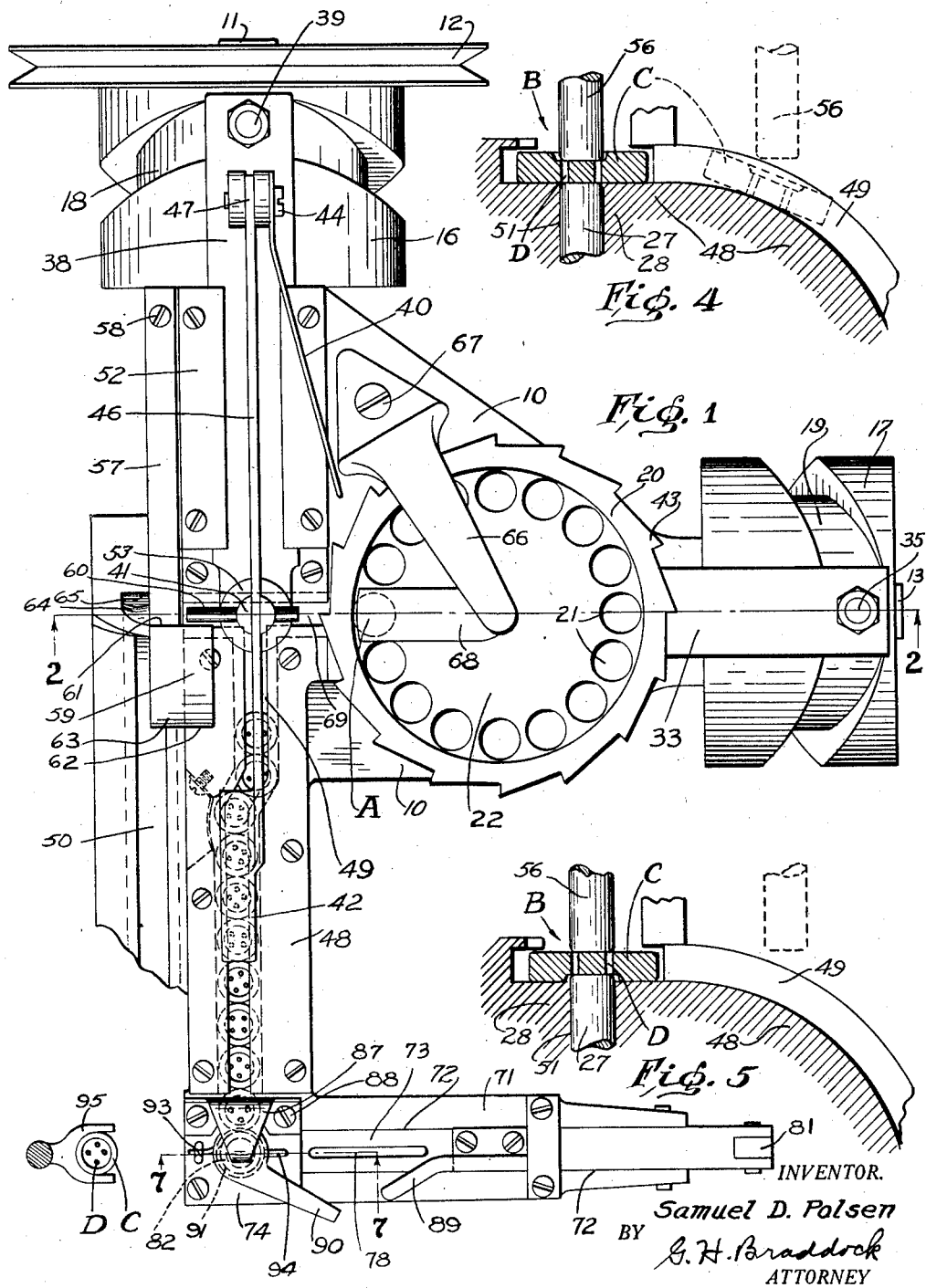
INVENTOR.
Samuel D. Polsen
BY G. H. Braddock
ATTORNEY Nov. 10, 1925.
S. D. POLSEN
1,560,605
BUTTON FEEDING MECHANISM
Filed March 12, 1924  2 Sheets-Sheet 2
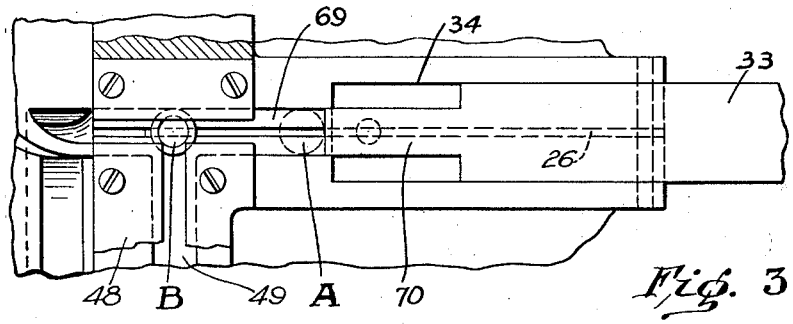
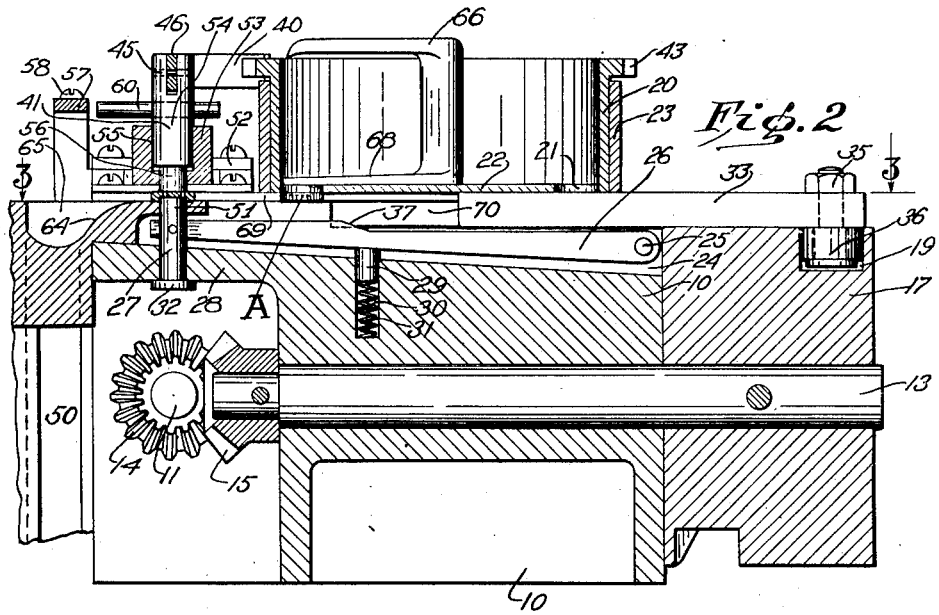
INVENTOR.
Samuel D. Polsen
BY
G. H. Braddock
ATTORNEY Patented Nov. 10, 1925.

1,560,605

UNITED STATES PATENT OFFICE.

SAMUEL D. POLSEN, OF BRIDGEPORT, CONNECTICUT.

BUTTON-FEEDING MECHANISM.

Application filed March 12, 1924. Serial No. 698,694.

*To all whom it may concern:*

Be it known that SAMUEL D. POLSEN, a citizen of the United States, and resident of Bridgeport, in the county of Fairfield and State of Connecticut, has invented certain new and useful Improvements in Button-Feeding Mechanisms, of which the following is a specification.

This invention relates to a machine for feeding and sorting duplicate articles such as buttons, buckles, clasps, caps, and the like, adapted to the purpose of delivering the articles to a predetermined location or to different predetermined locations in the machine and to the further purpose of so delivering the articles with desired side up, and in the case of buttons, with the holes so positioned that the buttons can be stitched to a garment, card, or the like without necessity for special attention to positioning upon the part of a seamstress or other operator.

Generally speaking, the machine includes a magazine adapted to receive duplicate articles to be sorted and having oppositely disposed faces differently shaped or constructed, such as buttons which are usually smooth or convex on one side (the bottom side) and concave on the other side (the top side), means for delivering the articles from the magazine one at a time, either side up, a feed slide for carrying each separate article to a sorting station as it is delivered from the magazine, and devices associated at the sorting station for carrying articles right side up in one direction, as to a runway leading to a sewing machine, and articles wrong side up in a different direction, as to remove them from the machine to be re-inserted in the magazine, or to turn them over and deliver them right side up to a second runway leading to a different sewing machine.

The invention as disclosed also includes an arrangement for withdrawing articles such as buttons from the runways and situating them in button holding means of sewing machines with their holes properly positioned so that they can be stitched down.

An object of the invention is to provide a simple machine for sorting buttons or like duplicate articles each having opposite faces of different configuration.

A further object is to provide a machine for sorting buttons or like duplicate articles having opposite faces of different configuration, provided with novel mechanism for carrying all articles which present themselves in the machine with corresponding face up (or down) in the same direction or to or toward the same location, and for carrying all articles having corresponding side up in a direction different from that in which articles having corresponding side down are carried.

A still further object is to provide in the machine means for delivering duplicate articles which present themselves desired or right side up to a predetermined location, such as a runway, and for turning over in the machine all of the articles which present themselves undesired or wrong side up and delivering them desired or right side up to a different predetermined location, such as a different runway.

Another object is to provide an arrangement for withdrawing the articles, such as buttons, from the locations or runways to which carried, adapted to the purpose of properly situating the articles in holding means of sewing machines.

Other objects and advantages will become apparent as the description proceeds, it being understood that the disclosure herein is merely illustrative of principles and meant in no way in a limiting sense, changes in details of construction and arrangement of parts being permissible so long as within the spirit of the invention and the scope of the appended claims.

In the accompanying drawing forming a part of this specification,

Fig. 1 is a top plan view of a machine in which the features of the invention are incorporated;

Fig. 2 is a fragmentary sectional view as on line 2—2 in Fig. 1;

Fig. 3 is a plan view of a fragment of the machine, partly in section, taken as on line 3—3 in Fig. 2;

Figs. 4 and 5 are enlarged sectional views detailing the button (or other articles) sorting station on the machine, Fig. 4 disclosing, in dotted lines, a button turned right side up being delivered from the sorting station to its proper runway, and Fig. 5 disclosing a button wrong side up being left at said station to be pushed, by the next button delivered to the sorting station, to a different runway;

Fig. 6 is a view detailing the button advancing brush;

Fig. 7 is a fragmentary sectional view as on line 7—7 in Fig. 1.

With respect to the drawing, 10 denotes the machine frame having mounted therein a main shaft 11 with driving pulley 12, and a driven shaft 13 arranged at right-angles to the main shaft, said shafts 11 and 13, respectively, having intermeshing bevel gears indicated 14 and 15.

Numerals 16 and 17 represent cam cylinders having cam grooves 18 and 19, the cylinder 16 being keyed to the shaft 11 at the rear of the frame, and the cylinder 17 being keyed to the shaft 13 at one side of the frame, at right-angles to the cylinder 16 and preferably in the same horizontal plane. The cam cylinders with grooves are for purposes to be explained.

A magazine 20 having spaced apart article receiving openings 21 in its base 22 may be rotatably mounted on the frame 10 in any manner. As disclosed, the magazine rests upon the frame and is rotatably fitted in a cylinder 23 secured to the frame in suitable manner.

As shown more clearly in Figs. 2 and 3, the upper face of the frame 10 is provided with a channel 24 which desirably extends parallel with the driven shaft 13 and is situated beneath the magazine 20. Pivotally mounted in this channel as at 25 (at the right hand side of Fig. 2) and situated beneath the magazine 20, is an arm 26 extending almost the full width of the frame. Fixed upon the end of this arm spaced from the pivot 25 is an article retainer 27 situated at the sorting station presently to be described and slidably arranged in an extension 28 of the frame, and intermediate the ends of this arm is a lug 29 slidably fitting an opening 30 in the frame, 31 representing a coil spring adapted to normally hold the arm 26 at its farthest distance from the frame and to consequently hold the article retainer in its position of highest elevation, a head or enlargement 32 upon the lower end of the article retainer and adapted to engage the extension 28 serving to limit its upward movement.

An article feeding slide 33 arranged in a way 34 of the frame above the channel 24 and between the arm 26 and the magazine, has secured thereto as at 35 a roller 36 adapted to ride in the cam groove 19 of the cam cylinder 17, rotation of the cam cylinder, evidently, reciprocating the slide. Preferably, the upper face of the slide is flush with the top surface of the frame.

As disclosed more clearly in Fig. 2, the upper edge of the arm 26 includes a bevel surface 37 lying in the path of reciprocation of the article feeding slide, whereby the slide can depress said arm against the action of the coil spring 31 and thus at intervals lower the article retainer to render it ineffective.

Numeral 38 denotes a second slide having secured thereto as at 39 a roller (not shown) similar to the roller 36 adapted to ride in the cam groove 18 of the cam cylinder 16. This second slide is, evidently, reciprocated as the cam cylinder 16 rotates. It carries a plurality of means, now to be described, including a magazine advancing arm 40, an article feeder 41, and an article advancing brush 42.

As will be more clear from Figs. 1 and 2, the magazine 20 has teeth 43 about its periphery, there being one tooth for each article receiving opening 21, and the advancing arm 40, secured to the slide 38 as indicated generally at 44, is adapted to successively engage the teeth to advance or rotate the magazine one step during each reciprocation of said slide 38. That is to say, when the magazine advancing arm moves to its extreme position toward the top of the sheet in Fig. 1 during its reciprocation, it engages back of a tooth 43, and as it moves in opposite direction, toward the bottom of the sheet, it rotates the magazine, successively advancing each opening 21 in the magazine base to a location A between and immediately above the article feeding slide 33 and the sorting station.

The article feeder 41 is adapted to cooperate at the sorting station with the article retainer 27. As disclosed, the article feeder is secured in suitable manner as at 45 to an arm 46 pivoted as at 47 to the slide 38 to have vertical swinging movement, this arm 46 also carrying the article advancing brush 42.

Numeral 48 represents a runway frame including the runways denoted 49 and 50, respectively. The highest elevation of the runway 49 terminates at the sorting station, indicated B, the upper end of said article retainer being slidably arranged in said runway frame as at 51, to extend slightly above the upper face of said runway frame at said sorting station, or to be flush with or below said upper face, depending upon the position in its reciprocation of the article feeding slide 33 as will be understood.

The slide 38 preferably reciprocates horizontally upon and has its movement stabilized by a bracket 52 carried by the main frame 10. As shown more clearly in Fig. 2, this slide has a thickened portion 53 receiving the article feeder 41, said feeder having an enlarged portion 54 loosely fitting a cavity 55 in said thickened portion, and a reduced cylindrical extension 56 adapted to project beyond the lower face of said slide 38.

Referring to Fig. 2, it will be seen that the reduced cylindrical extension 56 and the article retainer 27 are arranged to at times be in vertical alignment and are desirably of the same diameter, to be capable of fitting within the concave side of the button shown. Clearly, neither need be cylindrical, and the construction of each will depend upon the particular article being fed and sorted.

It will be obvious from the construction described, that the enlarged portion 54 will normally rest at the bottom of the cavity 55 to situate the extension 56 at its lowest possible elevation, the weight of the arm 46, as well as the weight of the article feeder 41 and the brush 42 accomplishing this result. Numeral 57 represents a bracket arm secured to the main frame 10 as denoted generally at 58 to have slight upward and downward movement and arranged parallel with the slide 38 and arm 46, extending from rear toward front of the machine, at one side of the sorting station. The forward portion of this bracket arm 57, in advance of the sorting station (see Fig. 1), includes a ledge 59, projecting toward the arm 46, constructed to cooperate with a cross-pin 60 carried by the article feeder 41 in causing the article feeder to be in elevated position during the movements of the slide 38 toward the rear of the machine (toward the top of the sheet in Fig. 1) and to allow said article feeder to be in its normal, lower position during its movements toward the front of the machine (toward the bottom in Fig. 1). That is, the length of said ledge 59 measures a distance just less than that representing the stroke of the slide 38, the rear edge 61 thereof being situated just in advance of the sorting station in Fig. 1 and the front edge 62 being in advance of said station a distance slightly less than the measurement representing the reciprocatory stroke of the slide 38. Adjacent said front edge 62 the upper face of the ledge 59 is smoothly curved as represented more clearly at 63 in Fig. 6, and adjacent said rear edge 61 the lower face of said ledge is similarly curved as indicated at 63'. Now, then, when the slide 38 is at its rearward limit the cross-pin is just beyond the rear edge of the ledge 59, (see Fig. 1), and when said slide is at its forward limit said cross-pin is just beyond the front edge of said ledge. As a consequence, supposing that the slide 38 is at its forward limit, during the rearward stroke of the article feeder the cross-pin rides up over the curved surface 63 of the ledge, and as the rearward stroke is completed said cross-pin rides off of said ledge, the combined weight of the arm 46, the article feeder 41 and the brush 42 causing the article feeder to assume the position as shown in Figs. 1 and 2. It is at this time that the article retainer and article feeder are in vertical alignment (see Fig. 2). Clearly, during the forward stroke of the slide 38, the cross-pin passes beneath the ledge, riding over the surface 63', lifting the bracket arm as the forward stroke progresses. At the end of the forward stroke the cross-pin passes beyond the front edge 62, the bracket arm is lowered by gravity, and upon the return stroke of the slide 38 the cross-pin rides up on the curved surface 63 as before.

The runway 49 may have any suitable construction and inclination. Preferably it is, as disclosed, of just sufficient width and depth to nicely receive one of the articles being sorted, the articles being adapted to successively enter the runway, one behind the other. See Fig. 1.

The runway 50, which may be approximately of the construction of runway 49, is as shown parallel with said last mentioned runway. It need not, however, be so situated. It must, though, be in communication with the sorting station. Referring to Figs. 1 and 2, 64 denotes a passage leading from the sorting station to the runway 50. The wall 65 of this passage (shown more clearly in Fig. 2) is of any configuration adapted to turn over articles which may enter the passage to pass to said runway 50. As illustrated, the rear part of this wall is in the general form of a spiral, each article entering the passage following the spiral and being deposited in the runway 50 with side up opposite that which was up when the article left the sorting station.

Articles such as buttons C are deposited in the magazine 20. As the magazine is given step by step rotation, the buttons enter the openings 21, one button to each opening. A bracket arm 66 secured to the main frame 10 as at 67 carries a guard 68 situated closely adjacent to or contiguous with the base of the magazine and positioned just above the location A, the end portion of said guard adjacent the sorting station practically covering the opening 21 which happens to be at the location A. As will be evident from Fig. 2, the base of the magazine has a thickness approximately equal to the thickness of the duplicate articles to be sorted, and either the feeding slide 33 or the upper face of the frame 10, as the case may be, precludes the passage of buttons from the magazine through any of the openings 21 except the particular opening at the location A. Beneath this location the frame 10 is cut away to provide a passage 69 of sufficient width and depth to receive an article deposited into said passage from the magazine as well as to receive the reduced end portion 70 of the feeding slide. The bottom of this passage, as disclosed clearly in Fig. 2, is in the plane of the upper face of the runway 49 at the sorting station, and the passage communicates with this location. Clearly, but one button at a time can enter the passage 69.

Suppose now that the slide 38 has just advanced to position an opening 21 with button at the location A and the button has dropped into the passage 69. At this time the slide 38 has reached the limit of its forward stroke and is ready to return. The slide 33 has already partly completed its feeding stroke, it having reached about the position of Fig. 3. Immediately following while the slide 38 is accomplishing its rearward stroke, with cross-pin 60 riding on ledge 59 of the bracket arm 57 to elevate the article feeder, the slide 33 has pushed the button to the sorting station directly above the article retainer 27, and has receded to about the position of Fig. 3. While in an advanced position, forward of the position shown in Fig. 3, the slide 33 causes the article retainer to be held flush with or beneath the upper face of the runway frame at the sorting station, in positions to the rear of said advanced position said slide 33 allows the coil spring 31 to act to elevate the article retainer above said upper face. As the slide 38 reaches its rearward movement the cross-pin is released from the ledge 59 and drops, the reduced extension 56 thereof then being in vertical alignment with the article retainer 27 to engage the upper side of the button. If the button is right side up, as in Fig. 4, the article feeder carries it ahead to the runway 49 during the succeeding forward stroke of the slide 38, the brush 42 assisting in advancing preceding buttons, although said brush can, evidently, be dispensed with. If the button is wrong side up, as in Fig. 5, the article retainer will enter it and retain it at the sorting station, the article feeder passing over the smooth surface of the button. See Fig. 5. When then the next succeeding button is fed from the location A to the sorting station, it pushes the wrong side up button into the passage 64 whence it will be pushed by other succeeding buttons through said passage and into the runway 50, being turned over by the wall 65 as it passes along. A brush (not shown) may assist in advancing the buttons through the runway 50.

As the cross-pin 60 passes rearwardly beyond the rear edge of the ledge 59, the article feeder drops instantly against the button. When the article feeder enters the concavity of a button as in Fig. 4, it forces through the instrumentality of the flat side of the button, the upper end of the article retainer to lie flush with the upper face of the runway frame at the sorting station, acting against the coil spring 31, so that the retainer does not interfere in any way with feeding the right side up buttons to the runway 49. When the article feeder engages the flat side of a button as in Fig. 5, it does not affect the article retainer, the upper end of said retainer now lying in the button concavity. After the article feeder has moved off of the button, the feeding slide 33 depresses the article retainer in the manner described, and during the interval the succeeding button is being positioned at the sorting station, the article retainer offers no interference to the pushing of the button at the sorting station into the passage 64. It is right after this interval and preferably a trifle before the article feeder drops that the feeding slide 33 allows the article retainer to become elevated.

It will be clear that the runway 50 can be dispensed with, buttons entering the passage 64 being merely pushed out of the machine to be returned to the magazine 20.

The buttons which enter the runways 49 and 50 will all be right side up, but their holes D will, naturally, be haphazardly arranged (see Fig. 1), and when the buttons are to be fed to a sewing machine it is feasible and desirable to provide mechanism for properly situating them in holding means of said sewing machine (with holes similarly located) to be stitched to garments, cards, or the like. In Figs. 1 and 7 mechanism suitable to its purpose as stated is shown applied to the runway 49.

Of this mechanism, 71 is a bracket secured, preferably at right-angles to the runway frame 48 and having a longitudinal way 72 receiving a slide 73. 74 is a block secured upon the bracket 71 adjacent its location of joining with the runway frame, the slide 73 having its forward portion arranged beneath this block. 75 is a channel leading through the bottom portion of the block 74 affording communication between the way 72 and the runway 49, said channel being of sufficient dimensions to nicely allow passage of a button or other article being acted upon and desirably having its end spaced from the runway 49 terminating in vertical alignment with the wall of the way 72 opposite the runway frame. Adjacent its front end the slide 73 has its upper face cut away as denoted at 76 in Fig. 7, the depth of the cut-away portion being approximately equal to the thickness of the button or other article, providing a rear wall 77 arranged transversely of said slide 73. 78 is a slot extending longitudinally of the upper face of the slide 73 and situated centrally of the width thereof to the rear of the cut-away portion 76, and 79 denotes the smoothly curved end of said slot adjacent the cut-away portion thereof, where said slot merges into the upper face 80 of said slide 73 between said cut-away portion and slot. 81 indicates the upper part of treadle mechanism (not shown) for reciprocating the slide.

Numeral 82 represents a preferably cylindrical button locater arranged in a concavity 83 in the block 74, the locater having a reduced portion 84 slidable in an opening 85 between the concavity 83 and channel 75, the reduced portion having downwardly extending locating pins 86 in its lower end adapted to enter the holes D of a button in the channel 75.

87 is a retaining bracket secured to the block 74 as at 88, adapted to stabilize the position of the locater 82, the upper end of said locater being adapted to engage said bracket (see Fig. 7).

89 is an arm extending obliquely from the slide 73 adapted to engage an arm 90 secured to the upper part of the locater 82 to cause said locater to be rotated during a portion of the stroke of reciprocation of the slide 73, as will be best understood from Fig. 1.

91 is a coil spring about the locater 82 having one of its ends secured to the locater as at 92 and its other end secured to the block 74 as at 93, said spring normally urging the locater to its lowermost position in the concavity 83, and being adapted to return the locating pins 86 to a fixed position, as in Fig. 7, when the arm 89 of the slide 73 is out of engagement with the arm 90 of the locater, all as will be understood.

94 is an L-shaped arm having its short portion in engagement with the under face of the arm 90 and its long portion slidably fitted in the block 74, the lower end of said long portion being adapted to engage either the upper face 80 of the slide 73, between the cut-away portion and slot to hold the locating pins elevated, or to engage the bottom wall of the slot or its smoothly curved portion to allow the coil spring 91 to act to draw the locating pins into the channel 75, depending upon the position in its reciprocation of the slide 73. 95 represents generally the holding means of a sewing machine in horizontal alignment with the slide 73.

The manner in which the button locating mechanism functions is obvious. In Fig. 7, the lower button, resting in the cut-away portion 76 contiguous with the wall 77 has been located and is ready to be fed straight ahead into the holding means 95. See Fig. 1. Evidently, the upper button in said Fig. 7, being confined in the channel 75 of the block 74 will remain in said channel during the feeding ahead of the lower button. As the slide advances, the upper face 80 thereof passes beneath the upper button and the slot 78 passes beneath the lower end of the longer portion of the L-shaped arm. The coil spring 91 acts to lower the locater to urge the locating pins against the button or into certain of its holes, depending upon the position of said holes. Then during further forward movement of the slide 73 the arm 89 engages the arm 90 to rotate the locater, the locating pins now with certainty entering the holes. Upon the return movement of the slide 73, the direction of rotation of the locater with button is reversed by the coil spring 91, and the button is deposited in the cut-away portion of the slide with holes located to correspond with the normal position of the locating pins, as in Fig. 7. At this time, the next succeeding button is fed into the channel 75, either by the brush 42 or by the continuous succession of buttons, above the located button, and the operation is repeated. It is to be noted that the part of the channel 75 above the way 72 will receive but a single article at a time, and a succeeding button cannot, therefore, enter until a preceding one has fallen to the cut-away portion of the slide.

Having thus fully described the invention, what I claim as new and desire to secure by Letters Patent is:

1. In a machine for sorting articles each having opposite faces of different configuration, a magazine to receive said articles, means for removing the articles one by one from the magazine either face up, an article sorting station, a feeding slide for advancing each article removed from the magazine to said sorting station, and means cooperating at the sorting station for carrying articles having corresponding face up in the same direction away from the sorting station and for carrying articles having opposite face up in a direction different from that in which articles having corresponding face up are carried.

2. In a machine for sorting articles each having opposite faces of different configuration, a magazine to receive said articles, means for removing the articles from the magazine either face up, an article sorting station, means for advancing each article removed from the magazine to the sorting station, and means cooperating at the sorting station for carrying articles having corresponding face up in the same direction away from the sorting station, a direction different from that in which articles having opposite face up are carried.

3. In a machine for sorting articles each having opposite faces of different configuration, a magazine to receive said articles, means for removing the articles from the magazine either face up, an article sorting station, means for advancing each article removed from the magazine to the sorting station, means cooperating at the sorting station for carrying articles having corresponding face up in the same direction away from the sorting station, and means for carrying articles having opposite face up in a different direction away from said station.

4. In a machine for sorting articles each having opposite faces of different configuration, a magazine to receive said articles, means for removing the articles one by one from the magazine either face up, an article sorting station, a feeding slide for advancing each article removed from the magazine to the sorting station, means cooperating at the sorting station for carrying articles having corresponding face up in the same direction away from the sorting station, and means for carrying articles having opposite face up in a different direction away from said station.

5. In a machine for sorting articles each having opposite faces of different configuration, a magazine to receive said articles, means for removing the articles from the magazine either face up, an article sorting station, means for advancing each article removed from the magazine to the sorting station, means cooperating at the sorting station for carrying articles having corresponding face up in the same direction away from the sorting station, means for carrying articles having opposite face up in a different direction away from said station, and means for turning said last mentioned articles over in the machine.

6. In a machine for sorting articles each having opposite faces of different configuration, a magazine to receive said articles, means for removing the articles one by one from the magazine either side up, an article sorting station, a feeding slide for advancing each article removed from the magazine to the sorting station, means cooperating at the sorting station for carrying articles having corresponding face up in the same direction away from the sorting station, means for carrying articles having opposite face up in a different direction away from said station, and means for turning said last mentioned articles over in the machine.

7. In a machine for sorting articles each having opposite faces of different configuration, a magazine to receive said articles, means for removing the articles from the magazine either side up, an article sorting station, means for advancing each article removed from the magazine to the sorting station, a plurality of runways, means located at the sorting station for carrying articles having desired face up to one of said runways, and means for turning over articles having undesired side up when at the sorting station and advancing them to another runway.

8. In a machine for sorting articles each having opposite faces of different configuration, a magazine to receive said articles, means for removing the articles one by one from the magazine either face up, an article sorting station, a feeding slide for advancing each article removed from the magazine to the sorting station, a plurality of runways, means for carrying articles having desired face up from said sorting station to one of said runways, means for turning over articles having undesired side up, and means for advancing said turned over articles to another runway.

9. In a machine for sorting articles each having opposite faces of different configuration, a magazine to receive said articles, means for removing the articles one by one from the magazine either face up, an article sorting station, a feeding slide for advancing each article removed from the magazine to the sorting station, a plurality of runways, a device for carrying articles presenting themselves desired side up from said sorting station to one of said runways, means for retaining articles presenting themselves undesired side up at the sorting station, and means for advancing said last mentioned articles to another runway.

10. In a machine for sorting articles each having opposite faces of different configuration, a magazine to receive said articles, means for removing the articles from the magazine one by one, a sorting station, means for advancing each article removed from the magazine to the sorting station either side up, a plurality of runways with which the sorting station is adapted to have communication, means cooperating at the sorting station for feeding articles having corresponding side up to one of said runways and for feeding articles having opposite side up to a different runway, and means for reversing the position of each article as it is fed to said different runway.

11. In a machine for sorting articles each having opposite faces of different configuration, such, for example, as buttons having a substantially flat face and a concave face, a magazine for receiving said articles, means for removing the articles one by one from the magazine, a sorting station including an article retainer, means for advancing each article removed from the magazine to the sorting station either side up, said article retainer being adapted to engage a face of said article, an article feeder adapted to engage the face of said article opposite the article retainer, both said article feeder and retainer being constructed to interengage with one face of said article, as said concave face, and to be slidable over the other face thereof, as said substantially flat face, means for bringing said article feeder into engagement with said article, and means for moving said article feeder substantially in the plane of said sorting station, whereby an article having face interengaging with said article feeder will be dragged by it away from said sorting station while said article feeder will slide off of an article having face interengaging with said article retainer leaving said last mentioned article at said sorting station.

12. The combination as specified in claim 11, wherein means is provided for removing an article held by said retainer from said sorting station in a direction different from that in which said article feeder carries its article, said article removing means including devices for withdrawing said article retainer from said article and a succeeding article pushed to said sorting station by said article advancing means.

13. In a machine of the character described, a station adapted to successively receive articles to be sorted, each article having opposite faces of different configuration, as, for example, a flat face and a concave face, and the articles being adapted to present themselves at the station either side up, an article retainer at the sorting station adapted to engage one face of each article, an article feeder adapted to simultaneously engage the face of said article opposite the article retainer, both said article feeder and retainer being constructed to interengage with one face of said article and to be easily removable from the other face thereof, means for bringing said article feeder into engagement with said article, means for moving said article feeder substantially in the plane of said sorting station to remove an article with which said feeder may be interengaging off of said article retainer or to slide said article feeder off of an article with which said article retainer may be interengaging, and means for removing said last mentioned article from said sorting station to a location different from that to which said article feeder moves its article.

14. The combination as specified in claim 13, wherein there are two runways with which said sorting station is adapted to have communication, the article feeder being adapted to deposit its article in one of said runways, and articles held by the article retainer being adapted to be deposited in the other runway, there being means located between said sorting station and said other runway for reversing each article fed to said other runway.

15. In a machine of the character described, an article sorting station adapted to receive articles each having opposite faces of different configuration, a plurality of runways with which said station is adapted to have communication, said runways adapted to receive sorted articles one behind the other, means for feeding articles having corresponding side up from said station to one of said runways, means for feeding articles having opposite side up to another runway, and means interposed between said sorting station and said other runway for reversing said articles as they pass along.

16. In a machine for sorting articles each having faces of different configuration, a container for said articles, means for removing the articles one by one from the container either face up, an article sorting station, means for advancing each article removed from the container to said sorting station, and means cooperating at the sorting station for carrying articles having corresponding face up in the same direction away from the sorting station, and for carrying articles having opposite face up in a different direction away from said station.

17. In a machine for sorting articles each having faces of different configuration, a container for said articles, means for removing the articles one by one from the container either face up, an article sorting station, means for advancing each article removed from the container to said sorting station, means cooperating at the sorting station for carrying articles having corresponding face up in the same direction away from the sorting station and for carrying articles having opposite face up in a direction different from that in which articles having corresponding face up are carried, and means for turning said last mentioned articles over in the machine.

Signed at Bridgeport, in the county of Fairfield, and State of Connecticut, this 23 day of Jan. A. D., 1924.

SAMUEL D. POLSEN.